United States Patent
Kornmann et al.

(10) Patent No.: US 10,130,888 B1
(45) Date of Patent: *Nov. 20, 2018

(54) GAME DATA VALIDATION (71) Applicant: Niantic, Inc., San Francisco, CA (US)

(72) Inventors: David Kornmann, Tucson, AZ (US); Charles Spirakis, Los Altos, CA (US); Chris Hibbert, Mountain View, CA (US); Mark A. Aubin, Sunnyvale, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,302

(22) Filed: May 4, 2017

Related U.S. Application Data (63) Continuation of application No. 13/955,077, filed on Jul. 31, 2013, now Pat. No. 9,669,293.
(Continued)

(51) Int. Cl.
*A63F 9/24* (2006.01)
*A63F 13/73* (2014.01)
(Continued)

(52) U.S. Cl.
CPC ............ *A63F 13/73* (2014.09); *A63F 13/216* (2014.09); *A63F 13/65* (2014.09); *A63F 13/69* (2014.09)

(58) Field of Classification Search
CPC ...... A63F 13/355; A63F 13/79; A63F 13/216; A63F 2300/205; A63F 2300/65; A63F 2300/8085; A63F 2300/5573
See application file for complete search history.

(56) References Cited

U.S. PATENT DOCUMENTS 6,530,841 B2   3/2003   Bull et al.
6,811,084 B2   11/2004  Tatsuta et al.
(Continued)

FOREIGN PATENT DOCUMENTS

EP   1 574 238 A1   9/2005
EP   2 101 889 A1   9/2009
(Continued)

OTHER PUBLICATIONS

Empire Avenue, "About Empire Avenue", Date Unknown, one page. [Online] [Retrieved Jul. 31, 2013] Retrieved from the Internet <www.empireavenue.com/about/>.
(Continued)

*Primary Examiner* — Jay Liddle
*Assistant Examiner* — Alex F. R. P. Rada, II
(74) *Attorney, Agent, or Firm* — Fenwick & West LLP (57) ABSTRACT

Methods and systems for verifying and/or modifying game data for a location-based game, such as a parallel reality game, are provided. Game data for the location-based game can be verified and/or modified by establishing one or more mini-games to be played within the location-based game. Players can be encouraged to play the mini-game by providing a reward, such as a virtual reward that can be used in the location-based game or by providing another suitable reward. Mini-game data received from a plurality of players of the mini-game can be aggregated and used to update game data for the location-based game. In this manner, game elements, game objectives, and/or game play for all players in the location-based game (even players that do not play in the mini-game) can be adjusted based on the aggregated responses to the mini-game.

20 Claims, 5 Drawing Sheets

Related U.S. Application Data (60) Provisional application No. 61/677,513, filed on Jul. 31, 2012.

(51) Int. Cl.
  *A63F 13/216* (2014.01)
  *A63F 13/65* (2014.01)
  *A63F 13/69* (2014.01)

(56) References Cited

U.S. PATENT DOCUMENTS

| | | |
|---|---|---|
| 7,275,994 B2 | 10/2007 | Eck et al. |
| 7,435,179 B1 | 10/2008 | Ford |
| 7,491,123 B2 | 2/2009 | Smith |
| 7,564,469 B2 | 7/2009 | Cohen |
| 7,946,919 B2 | 5/2011 | Piccionelli |
| 7,970,749 B2 | 6/2011 | Uhlir et al. |
| 8,002,617 B1 | 8/2011 | Uskela et al. |
| 8,070,608 B2 | 12/2011 | Uhlir et al. |
| 8,108,459 B1 | 1/2012 | Hoffman et al. |
| 8,190,733 B1 | 5/2012 | Hoffman et al. |
| 8,267,794 B2 | 9/2012 | Van Luchene |
| 8,287,383 B1 | 10/2012 | Etter et al. |
| 8,291,016 B1 | 10/2012 | Whitney et al. |
| 8,308,568 B2 | 11/2012 | Amaitis et al. |
| 8,366,446 B2 | 2/2013 | Kreiner et al. |
| 2001/0009867 A1 | 7/2001 | Sakaguchi et al. |
| 2002/0090985 A1 | 7/2002 | Tochner et al. |
| 2003/0036428 A1 | 2/2003 | Aasland |
| 2003/0224855 A1 | 12/2003 | Cunningham |
| 2004/0029625 A1 | 2/2004 | Annunziata |
| 2004/0058732 A1 | 3/2004 | Piccionelli |
| 2004/0255268 A1 | 12/2004 | Meijer et al. |
| 2005/0049022 A1 | 3/2005 | Mullen |
| 2006/0105838 A1 | 5/2006 | Mullen |
| 2006/0258420 A1 | 11/2006 | Mullen |
| 2006/0281553 A1 | 12/2006 | Hawkins et al. |
| 2006/0284789 A1 | 12/2006 | Mullen |
| 2006/0287026 A1 | 12/2006 | Mullen |
| 2007/0021166 A1 | 1/2007 | Mattila |
| 2007/0060408 A1 | 3/2007 | Schultz et al. |
| 2007/0104348 A1 | 5/2007 | Cohen |
| 2007/0149284 A1 | 6/2007 | Plavetich et al. |
| 2007/0265089 A1 | 11/2007 | Robarts et al. |
| 2007/0281765 A1 | 12/2007 | Mullen |
| 2007/0281766 A1 | 12/2007 | Mullen |
| 2008/0015018 A1 | 1/2008 | Mullen |
| 2008/0015024 A1 | 1/2008 | Mullen |
| 2008/0146338 A1 | 6/2008 | Bernard et al. |
| 2009/0005140 A1 | 1/2009 | Rose et al. |
| 2009/0017913 A1 | 1/2009 | Bell et al. |
| 2009/0024986 A1 | 1/2009 | Meijer et al. |
| 2009/0281851 A1 | 11/2009 | Newton et al. |
| 2010/0287011 A1 | 11/2010 | Muchkaev |
| 2010/0331089 A1 | 12/2010 | Priebatsch et al. |
| 2011/0004658 A1 | 1/2011 | Chesley et al. |
| 2011/0081973 A1 | 4/2011 | Hall |
| 2011/0319148 A1 | 12/2011 | Kinnebrew et al. |
| 2012/0040745 A1 | 2/2012 | Auterio et al. |
| 2012/0052953 A1 | 3/2012 | Annambhotla et al. |
| 2012/0094770 A1 | 4/2012 | Hall |
| 2012/0142429 A1 | 6/2012 | Muller |
| 2012/0157210 A1 | 6/2012 | Hall |
| 2012/0185892 A1 | 7/2012 | Camplejohn et al. |
| 2012/0190452 A1 | 7/2012 | Weston et al. |
| 2012/0226627 A1 | 9/2012 | Yang |
| 2012/0231887 A1 | 9/2012 | Lee et al. |
| 2012/0233258 A1 | 9/2012 | Vijayaraghavan et al. |
| 2012/0246104 A1 | 9/2012 | Di Sciullo et al. |
| 2012/0315992 A1 | 12/2012 | Gerson et al. |
| 2013/0004932 A1 | 1/2013 | Mahajan et al. |
| 2013/0005475 A1 | 1/2013 | Mahajan et al. |
| 2013/0005480 A1 | 1/2013 | Bethke et al. |
| 2013/0072308 A1 | 3/2013 | Peck et al. |
| 2013/0117326 A1 | 5/2013 | De Smet et al. |
| 2013/0178257 A1 | 7/2013 | Langseth |

FOREIGN PATENT DOCUMENTS

| | | |
|---|---|---|
| EP | 2 393 056 A1 | 12/2011 |
| EP | 2 416 289 A1 | 2/2012 |
| WO | WO 02/062436 A2 | 8/2002 |
| WO | WO 2008/076764 A1 | 6/2008 |

OTHER PUBLICATIONS klout.com, "Klout Score", Date Unknown, four pages. [Online] [Retrieved Apr. 1, 2013] Retrieved from the Internet <http://klout.com/corp/klout_score>.

Matyas, S., "Playful Geospatial Data Acquisition by Location-based Gaming Communities", The International Journal of Virtual Reality, 2007, 6(3): 1-10.

United States Office Action, U.S. Appl. No. 13/955,077, dated Oct. 21, 2016, 16 pages.

GAME DATA VALIDATION

PRIORITY CLAIM

This application is a continuation of U.S. patent application Ser. No. 13/955,077, filed Jul. 31, 2013, which claims the benefit of priority of U.S. Provisional Patent Application 61/677,513, filed Jul. 31, 2012. Each application is incorporated herein by reference in its entirety.

FIELD

The present disclosure relates generally to location-based gaming, and more particularly, to a system and method for game data validation within a location-based gaming system.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. Such gaming systems typically do not have a virtual world geography that parallels the real world. Location-based games use the real world as their geography. Some location-based games add virtual locations on a map that parallels the real world geography. Such games, however, are typically focused on real world objectives. These games typically do not include a virtual world that parallels the real world and that acts as a virtual game environment in which many players can interact and perform various game objectives in the parallel virtual world by navigating and performing actions in the real world.

A location-based game having a virtual world that parallels the real world can rely on location specific information, such as the locations of landmarks, monuments, or other points of interest in the real world. For instance, virtual elements in the virtual world can be linked or associated with real world landmarks or objects in the actual world. The virtual elements linked with the real world landmarks can depend on information associated with the real world landmarks, such as the location of the landmark, the relevance of the landmark, the accessibility of the landmark and/or other information associated with the landmark.

The collection of a database of such information can be a tedious process and may require user input from a plurality of users. As a result, the database content can be relatively noisy. The size of the database can often prohibit manual editing of the database content by system administrators. Some noise can be removed by applying filters based on description fields associated with database content or by using pattern matching to associate noise with existing database content. These techniques, however, may not be suitable for a location based game having a virtual world paralleling the real world having game objectives involving virtual game elements or objects associated with or linked to the location of real world objects.

SUMMARY

Aspects and advantages of embodiments of the invention will be set forth in part in the following description, or may be obvious from the description, or may be learned through practice of the embodiments.

One exemplary aspect of the present disclosure is directed to a computer-implemented method of verifying game data for a location-based game. The method includes receiving at a computing device mini-game data indicative of player actions for a plurality of players in a mini-game associated with the location-based game. The mini-game has as a mini-game objective that requires player actions useful for modifying or verifying game data within the location-based game. The method further includes aggregating, with the computing device, mini-game data indicative of player actions for the plurality of players in the mini-game and adjusting game data stored in a game database for the location-based game based on the aggregated mini-game data.

Other exemplary implementations of the present disclosure are directed to systems, apparatus, non-transitory computer-readable media, devices, and user interfaces for validating game data within a location-based game.

These and other features, aspects and advantages of various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the invention. For instance, features illustrated or described as part of one embodiment can be used with another embodiment to yield a still further embodiment. Thus, it is intended that aspects of the present disclosure cover such modifications and variations.

Overview

Generally, the present disclosure is directed to a system and method for verifying game data for a location-based game, such as a parallel reality game. Game data for the location-based game can be verified and/or modified by establishing one or more mini-games to be played within the location-based game. Players can be encouraged to play the mini-game by providing a reward, such as a virtual reward that can be used in the location-based game or by providing another suitable reward.

More particularly, a location-based game can have a player gaming area that includes a virtual environment with a geography that parallels at least a portion of the real world geography. Players navigate the virtual world by moving to different geographic locations in the real world. For instance, a player can navigate a range of coordinates in the virtual world by navigating a range of coordinates in the real world. The virtual environment can include one or more virtual elements that are linked with real world landmarks. Various game objectives can require players to interact with these virtual elements as part of an overall game objective for the location-based game. Information associated with the real world landmarks linked to the virtual elements (e.g. location information, landmark description information, landmark relevance information, etc.) can be stored in a game database that includes data for the location-based game.

The game database can include incorrect data associated with landmarks linked to virtual elements within the parallel virtual world. For instance, the game database can be populated at least in part by user generated content. This user generated content can include incorrect information, misleading information and/or can include information about landmarks that are irrelevant or unimportant to the location-based game. The game database can include user provided information about a plurality of landmarks in a specific geographic area. Only certain of these landmarks may be relevant to one or more game objectives in the location-based game.

To verify and/or modify game data in the location-based game, aspects of the present disclosure are directed to providing one or more mini-games within the location-based game for performance by a plurality of players within the location-based game. Each mini-game can have an objective that requires mini-game players to perform actions that can be used to modify or verify game data for the location-based game. For instance, players can verify the location of landmarks, vote for or against landmarks based on specific criteria, choose between two random landmarks based on specified criteria, etc. The game system can aggregate player responses or actions in the mini-game and update or modify game data for the overall location-based game based on the aggregated player responses. In this manner, the subject matter of the present disclosure can have a technical effect of changing or modifying game elements, game objectives, and/or game play for all players in the location-based game (even players that do not play in the mini-game) based on the aggregated responses to a mini-game within the location-based game. By providing a method for verifying game data associated with real world landmarks linked with virtual elements in the location-based game, the link between the real and the virtual world can be improved, providing an enhanced parallel reality associated with the location-based game.

One example mini-game can require players to verify the location or other attributes of a landmark linked to a virtual element in the location based game. For instance, a mini-game can require a player to travel to a specific landmark in the real world and confirm the existence of the landmark and/or the location of the landmark. Player responses or actions in this mini-game can be used to verify or update location or other information associated with the landmark in the game database. Game objectives for the location-based game can then be modified to include game objectives associated with the virtual elements linked to the landmark.

Another example mini-game can require players to vote for or against approval of a specific landmark based on specified objective or subjective criteria. Alternatively or in addition, the mini-game can offer players to choose between two random landmarks based on specified objective or subjective criteria. Player responses to these mini-games can be aggregated and used to modify game data associated with the location-based game. For instance, player responses to these mini-games can make it possible to add landmarks that were originally discarded during the game database generation process; confirm existing landmarks as being relevant in the context of the location-based game; discard landmarks that are deemed irrelevant in the context of the location-based game; and rank or prioritize landmarks within the context of the location-based game.

Exemplary Location-Based Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods for modifying or verifying game data according to aspects of the present disclosure can be implemented using a single computing device or across multiple computing devices.

Figure 1:
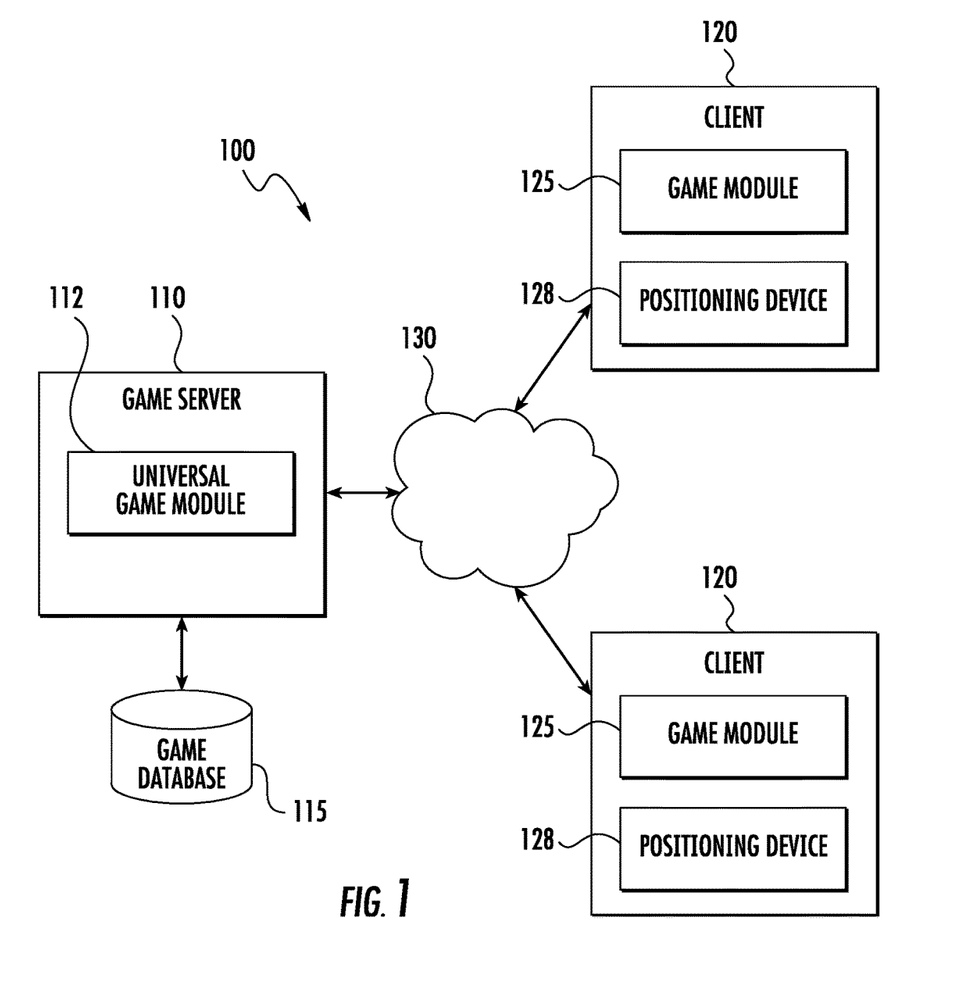
FIG. 1 depicts an exemplary computer-based system for implementing a location-based game according to an exemplary embodiment of the present disclosure.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
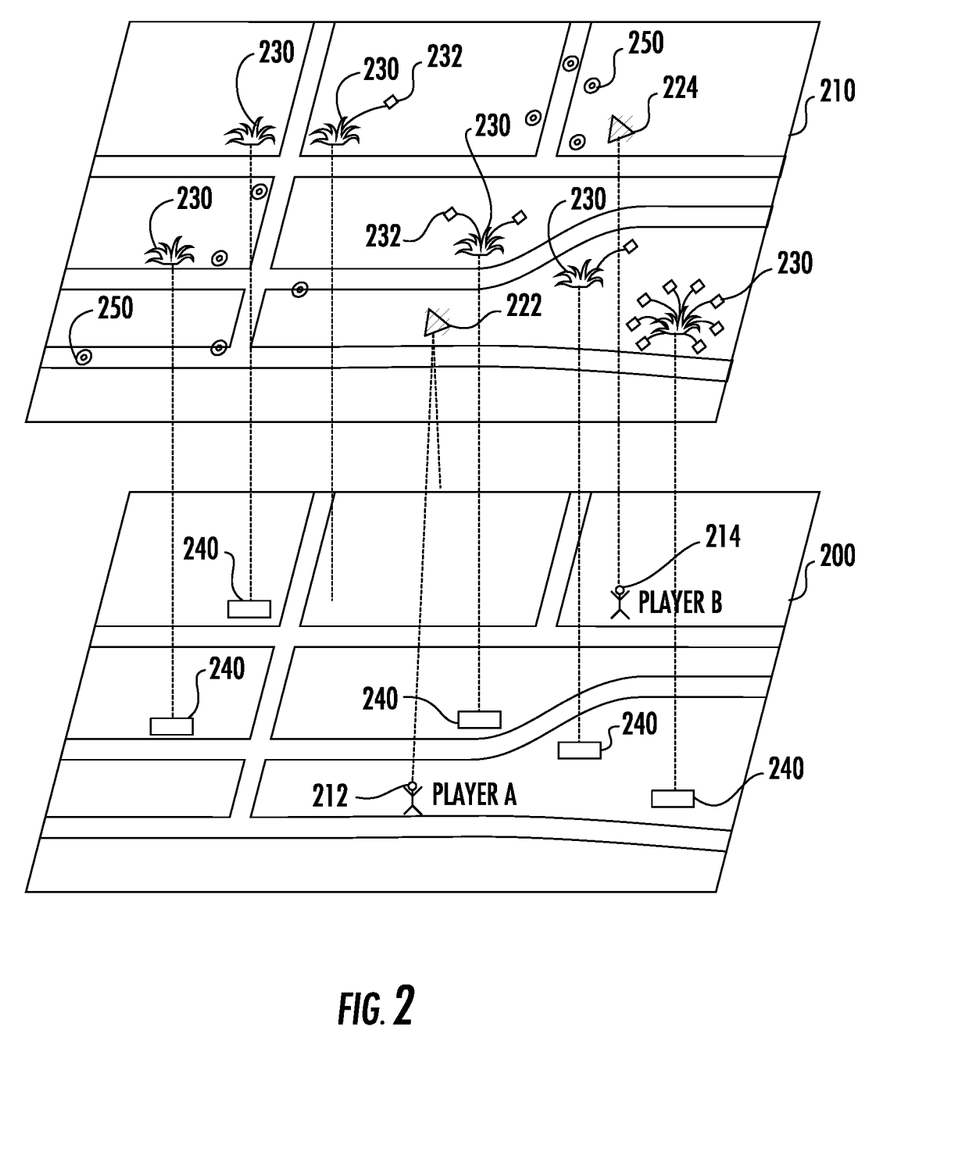
FIG. 2 depicts a representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 can be used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific locations to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal game module 112 that controls aspects of the location-based game for all players and receives and processes each player's input in the location based game. On the client-side, each client 120 can include a game module 125 that operates as a gaming application so as to provide a user with an interface to the system 100. The game server 110 transmits game data over the network 130 to the client 120 for use by the game module 125 at the client 120 to provide local versions of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include one or more processors and one or more computer-readable media. The computer-readable media can store instructions which cause the one or more processors to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

The game server 110 can be configured to receive requests for game data and other information from one or more clients 120 (for instance, via remote procedure calls (RPCs)) and to respond to those requests via the network 130. For instance, the game server 110 can encode game data in one or more data files and provide the data files to the client 120.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data and information to the clients 120 over the network 130. For instance, the universal game module 112 can manage responses to calls made by game modules 125 running on client devices 120.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system, wearable computing device, a display with one or more processors, or other such device. In short, a client 120 can be any computer-device or system that can execute a game module 125 to allow a player to interact with the game system 100.

The client 120 can include one or more processors and one or more computer-readable media. The computer-readable media can store instructions which cause the one or more processors to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130. A network interface can include any suitable components for interfacing with one more networks, including for example, transmitters, receivers, ports, controllers, antennas, or other suitable components.

The game module 125 executed by the client 120 provides an interface between a player and the location-based game. The game module 125 can render computer-readable instructions to present a user interface on a display device associated with the client 120 that displays a virtual world (e.g. renders virtual world imagery) associated with the game and allows a user to interact in the virtual world to perform various game objectives. The game module 125 can also control various other outputs to allow a player to interact with the game without requiring the player to view a display screen. For instance, the game module 125 can control various audio, vibratory, or other notifications that allow the player to play the game without looking at the display screen. The game module 125 can access game data received from the game server 110 to provide an accurate representation of the game to the user. The game module 125 can receive and process player input and provide updates to the game server 110 over the network 130.

Because the gaming system 100 is for a location-based game, the client 120 is preferably a portable computing device that can be easily carried or otherwise transported with a player, such as a smartphone or other portable device. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the game module 125. The game module 125 updates the player position in the virtual world based on the actual position of the player in the real world. In particular, the location of the player in the virtual world can correspond to the location of the player in the real world. The game module 125 can provide player position information to the game server 110 over the network 130 such that the universal game module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
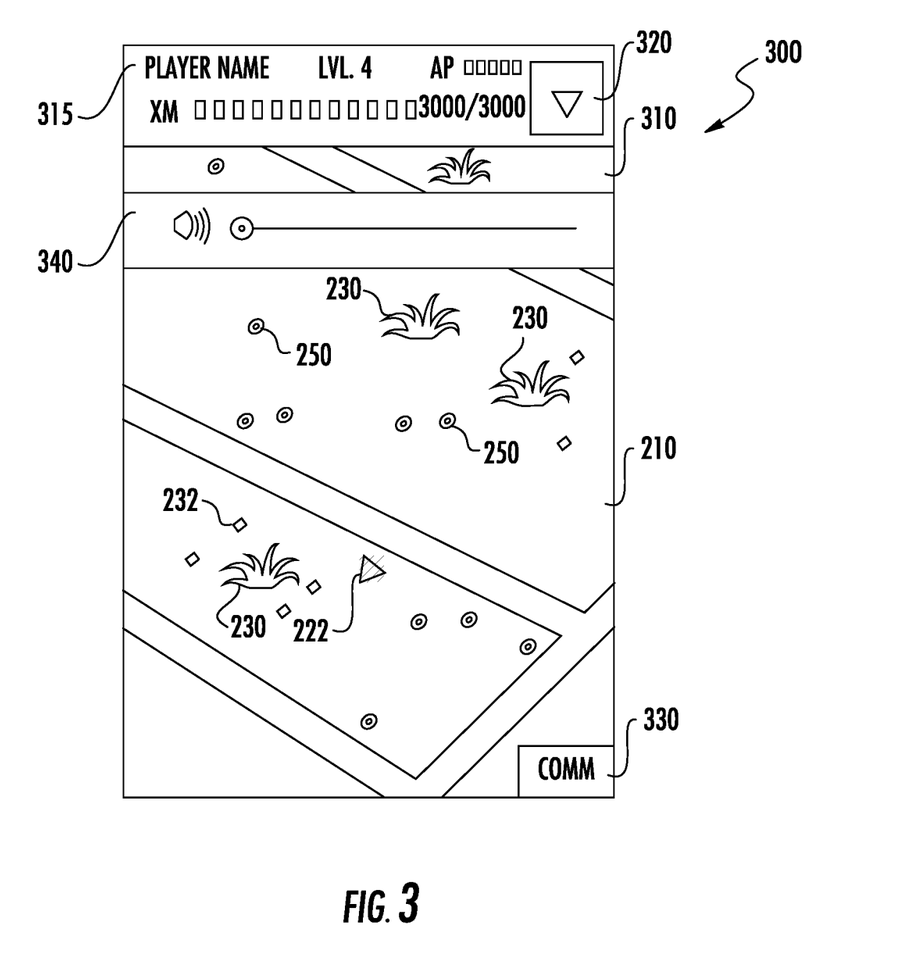
FIG. 3 depicts an exemplary game interface of a location-based game according to an exemplary embodiment of the present disclosure.

FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Exemplary Method for Game Data Validation

Figure 4:
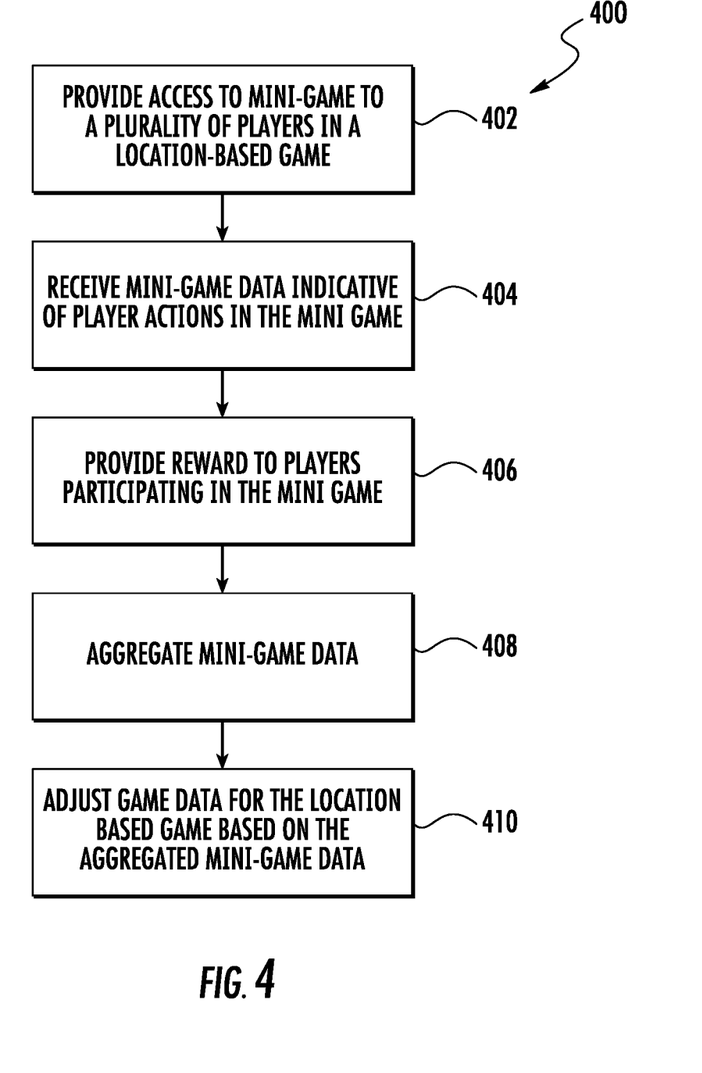
FIG. 4 depicts a flow diagram of an exemplary method according to an exemplary embodiment of the present disclosure.

FIG. 4 depicts a flow diagram of a method (400) for modifying or verifying game data for a location-based game according to an exemplary embodiment of the present disclosure. The exemplary method (400) can be implemented using any suitable computing device(s), such as the game server 110 of FIG. 1. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (402), the method includes providing access to a mini-game to a plurality of players in a location-based game. For instance, the exemplary game server 110 of FIG. 1 can provide access to or host data files necessary for providing a mini-game to one or more clients 120 over the network 130. The mini-game can be provided to players of the location-based game that have indicated a willingness to participate in mini-games by adjusting player profiles or other settings in the location-based game. The interval and frequency at which players are provided access to mini-games can be set to any desired level. Once a player receives a request to participate in a mini-game, the player can choose to participate in the mini-game or choose not to participate in the mini-game as desired.

According to aspects of the present disclosure, the mini-game has a mini-game objective requiring player actions useful for modifying or verifying game data for the location based game. For example, the mini-game can require player actions that can be used to verify or update game data associated with landmarks linked to virtual elements in the location based game. Exemplary mini-games requiring player actions useful for modifying or verifying game data for the location-based game will be discussed below.

Referring to FIG. 4 at (404), the method includes receiving mini-game data indicative of player actions in the mini-game from a plurality of players. For instance, the exemplary game server 110 of FIG. 1 can receive data files indicative of player actions in the mini-game from a plurality of clients 120 over the network 130. The mini-game data provided will be dependent on the type of mini-game provided to the players. For instance, mini-game data associated with a mini-game having a mini-game objective requiring verification of a landmark's existence or location can include data indicative of the landmarks existence or location, such as a photograph and/or geographic coordinates associated with the landmark. As another example, mini-game data associated with a mini-game having a mini-game objective requiring a player to select between a plurality of landmarks based on objective and/or subjective criteria can include data indicative of the player's selection.

Referring to FIG. 4 at (406), the method includes providing a reward to players that participate in the mini-game. The reward can be any suitable reward. In one example, the reward is a virtual reward that can be used in the virtual world associated with the location-based game. The virtual reward can be virtual currency, virtual energy, enhanced powers, virtual items, experience points or other suitable reward. The reward can also be suitable for use in the real world. For instance, the reward can include a coupon, voucher, redeemable currency or other reward that can be used by a player in the real world. In this manner, player actions in the mini-game in the virtual world can affect actions in the real world.

At (408) the mini-game data is aggregated. For instance, the game server 110 of FIG. 1 can aggregate all the mini-game date received over the network 130 from players participating in the mini-game. Aggregating the mini-game data can include collecting all the mini-game data from various sources and/or performing various analysis techniques on the mini-game data to determine an outcome of the mini-game. The analysis techniques can vary depending on the type of mini-game. For instance, in a mini-game having a mini-game objective requiring verification of a landmark's existence or location can include identifying a consensus or agreement between a plurality of player responses to the mini-game. In a mini-game having a mini-game objective requiring a player to select between a plurality of landmarks based on objective and/or subjective criteria can include generating ranking scores for the landmarks based on the player responses to the mini-game. The ranking score can be based on the number of mini-game players selecting or approving the particular landmark in the mini-game.

At (410) the method includes adjusting game data in the game database based on the aggregated mini-game data. For example, data associated with real world landmarks linked to virtual elements in the virtual world (e.g. location information) can be verified, modified, or adjusted based on the mini-game data. In addition, data associated with virtual elements linked with the landmarks can be adjusted or modified. For instance, the location, relevance and/or significance of virtual elements in the virtual world can be adjusted based on the mini-game data. As another example, game objectives for the location-based game can be adjusted for all players of the location-based game. For instance, game objectives can be adjusted to require player interaction with more relevant landmarks (e.g. landmarks with higher ranking scores generated from the mini-game data).

Example Mini Game #1

One exemplary mini-game can have a mini-game objective of verifying the existence and/or location of a particular landmark and will be discussed with reference to the gaming system of FIG. 1. In this example mini-game, the game server 110 can determine when a player of the overall location-based game is proximate a landmark or other object in the real world that has not been verified in the game database 115. The game server 110 can then send data associated with the mini-game to a player's client device 120 over the network 130. The data associated with the mini-game can include a request to determine whether the player desires to participate in the mini-game. If the player elects to participate in the mini-game, the player can be informed of the unverified location of the landmark in the real world.

To complete the mini-game, the player must travel to the unverified location of the landmark in the real world. When the player reaches the unverified location of the landmark, the player can perform various actions to confirm the existence and/or location of the landmark. For instance, the player can take a photograph of the landmark. The player provides mini-game data indicative of the player actions in the mini-game to the game server 110 over the network 130. The mini-game data includes data indicative of whether the landmark exists and/or is actually located at the unverified location. For instance, the player can send the photograph of the landmark and send geographic coordinates obtained, for instance, from the positioning device 128 of the client 120 used by the player. Once the player completes the mini-game objective, the game server 110 can provide the player with a virtual reward. For instance, the game server 110 can credit additional virtual currency or virtual energy to the player in the location-based game.

The game server 110 can provide the mini-game to multiple players and receive mini-game data from multiple players. The game server 110 can aggregate the mini-game data from the multiple players and identify a consensus or agreement in the mini-game data from the multiple players. For instance, if a threshold number of players provide identical or similar mini-game data in response to the mini-game, the game server 110 can verify the existence and/or location of the landmark in the game database.

The game server 110 can then change virtual elements or game objectives in the location based game based on the verified landmark. For example, the game server 110 can link a virtual element in the virtual world to the landmark.

The virtual element can be a virtual element that needs to be captured to complete a game objective for the location-based game. Alternatively, or in addition, the game server 110 can locate one or more virtual items or virtual energy to be collected by a player at a location in the virtual world corresponding to the location of the verified landmark in the actual world. Other suitable adjustments to the game data can be made based on the aggregated response to the mini-game.

Example Mini Game #2

Another exemplary mini-game can have a mini-game objective requiring players to vote for or against approval of a specific landmark based on specified objective or subjective criteria. In this example mini-game, the game server 110 can periodically send data associated with the mini-game to one or more players over network 130. The data associated with the mini-game can include images of one or more landmarks and can include a request asking the player to vote for or against approval of the landmark(s) based on specified objective or subjective criteria. The objective criteria can be directed to specific aspects of the landmark, such as whether the landmark has certain tangible characteristics in terms of visibility, size, appearance, importance, etc. The subjective criteria can be intended to measure the player's personal feelings towards the landmark. For instance, the request can ask the mini-game player whether the landmark is "cool," whether the player "likes" the landmark, or other suitable request.

To complete the mini-game, the player simply votes for or against approval of the particular landmark. The player can play the mini-game at any location and at any time, such as while standing in line at a merchant or other business. The player can provide mini-game data indicative of the player response in the mini-game to the game server 110 over the network 130. Once the player completes the mini-game objective, the game server 110 can provide the player with a virtual reward. For instance, the game server 110 can credit additional virtual currency or virtual energy to the player in the location-based game.

The game server 110 can receive mini-game data from multiple players. The game server 110 can aggregate the mini-game data from the multiple players and rank or prioritize the landmarks based on the responses received from the mini-game players. For instance, the game server 110 can assign a ranking score used to prioritize the landmarks based on the number of positive responses associated with the landmark received from the players of the mini-game.

The game server 110 can then change virtual elements or game objectives in the location based game based on the verified landmark. For example, the game server 110 can link a virtual element in the virtual world only to those landmarks with high ranking scores or that meet a threshold level of approval. The game server 110 can discard landmarks that do not meet a threshold level of approval. The game server 110 can associate more important game objectives and/or elements with landmarks with higher ranking scores and less important game objectives and/or elements with landmarks with lower ranking scores. Other suitable adjustments to the game data can be made based on the aggregated response to the mini-game.

Example Mini Game #3

Another exemplary mini-game can have a mini-game objective requiring players to select one of two or more landmarks based on specified objective or subjective criteria. In this example mini-game, the game server 110 can periodically send data associated with the mini-game to one or more players over network 130. The data associated with the mini-game can include images of a plurality landmarks and can include a request asking the player to select one of the plurality of the landmark(s) based on specified objective or subjective criteria. The objective criteria can be directed to a specific aspect of the landmark, such as whether the landmark has certain tangible characteristics in terms of visibility, size, appearance, importance, etc. The subjective criteria can be intended to measure the player's personal feelings towards the landmark. For instance, the request can ask the mini-game player which landmark is "coolest," which landmark the player "likes" the best, or other suitable request.

To complete the mini-game, the player simply votes for a particular landmark out of the plurality of landmarks. The player can play the mini-game at any location and at any time, such as while standing in line at a merchant or other business. The player can provide mini-game data indicative of the player response in the mini-game to the game server 110 over the network 130. Once the player completes the mini-game objective, the game server 110 can provide the player with a virtual reward. For instance, the game server 110 can credit additional virtual currency or virtual energy to the player in the location-based game.

The game server 110 can receive mini-game data from multiple players. The game server 110 can aggregate the mini-game data from the multiple players and rank or prioritize the landmarks based on the responses received from the mini-game players. For instance, the game server 110 can assign a ranking score used to prioritize the landmarks based on the number of positive responses associated with the landmark received from the players.

The game server 110 can then change virtual elements or game objectives in the location based game based on the verified landmark. For example, the game server 110 can link a virtual element in the virtual world only to those landmarks with high ranking scores or that meet a threshold level of approval. The game server 110 can discard landmarks that do not meet a threshold level of approval. The game server 110 can associate more important game objectives and/or elements with landmarks with higher ranking scores and less important game objectives and/or elements with landmarks with lower ranking scores. Other suitable adjustments to the game data can be made based on the aggregated response to the mini-game.

Exemplary Client-Server Flow Diagram

Figure 5:
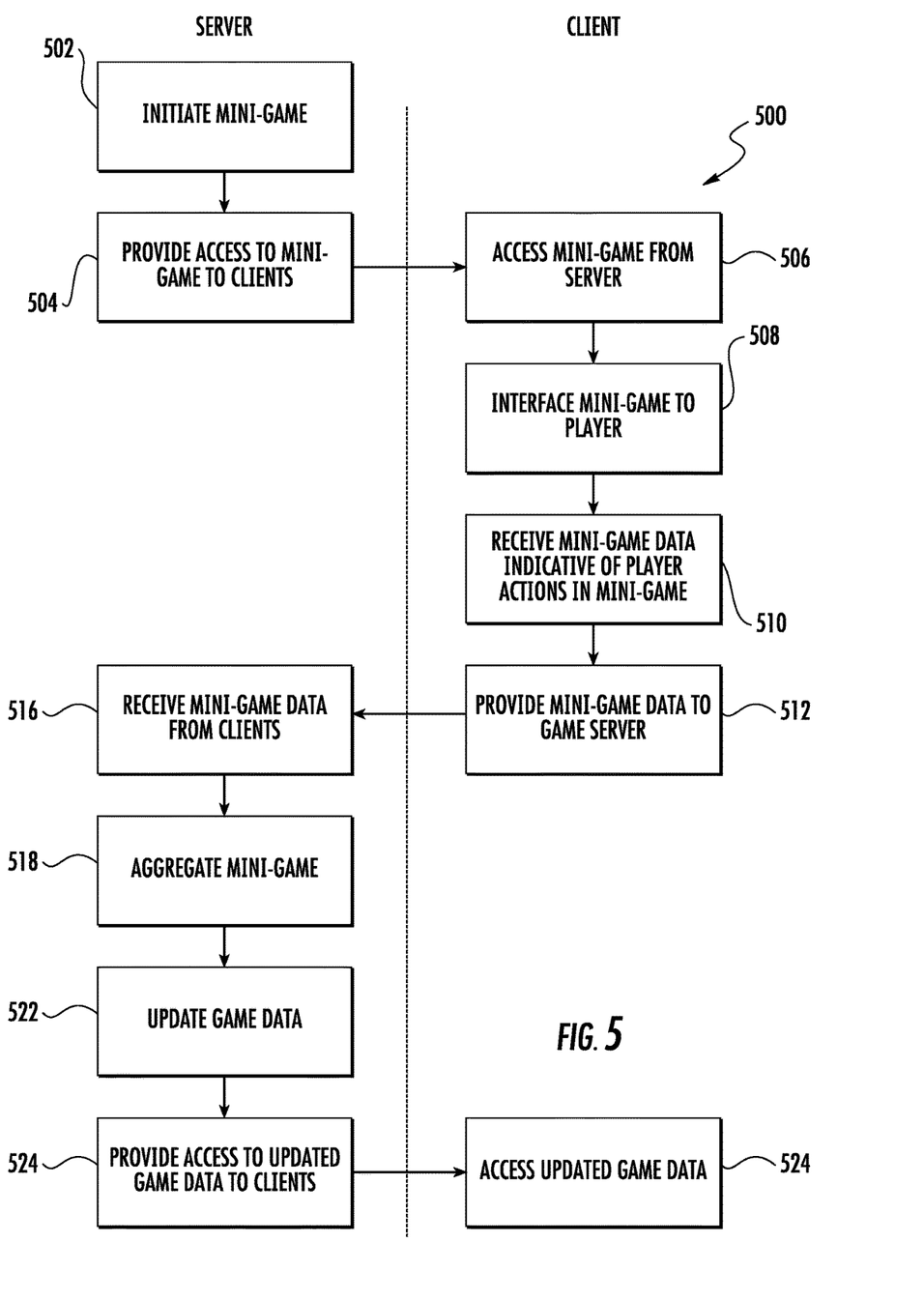
FIG. 5 depicts a client-server flow diagram of an exemplary method according to an exemplary embodiment of the present disclosure.

FIG. 5 depicts a client-server flow diagram of an exemplary method (500) for modifying game data for a location-based game according to an exemplary embodiment of the present disclosure. The exemplary method (500) can be implemented using any suitable computing device(s), such as the game server 110 of FIG. 1. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (502), the game server 110 initiates a mini-game. For instance, the universal game module 112 can initiate a mini-game to be provided to a plurality of players of the location-based game. The game module 112 can determine the type of mini-game, the subject matter of the mini-game, and the number of players of the mini-game. At (504), the game server 110 provides access to the mini-game to a plurality of clients 120 over the network 130. For instance, the game server 110 can send files encoded with mini-game data to a plurality of clients 120 over the network 130.

At (506), a client 120 accesses the mini-game at the game server 110. The client 120 then presents the mini-game to the player (508). For instance, the client 120 displays information associated with the mini-game to the player in a display device. At (510), the client 120 receives the mini-game data indicative of player actions in the mini-game. For instance, the client 120 receives player input through a user interface indicative of a player response or action in the mini-game. At (512), the client 120 provides the mini-game data to the game server 110.

At (516), the game server 110 receives the mini-game data from a plurality of clients 120 and aggregates the mini-game data (518). Aggregating the mini-game data can include collecting all the mini-game data from various sources and/or performing various analysis techniques on the mini-game data to determine an outcome of the mini-game. The analysis techniques can vary depending on the type of mini-game.

At (520), the game server 110 updates the game data based on the aggregated response to the mini-game. For instance, as discussed above, the game server 110 can add landmarks to the game database 115 that were originally discarded during the game database generation process; can confirm existing landmarks as being relevant in the context of the location-based game; can discard landmarks from the game database 115 that are deemed irrelevant in the context of the location-based game; and rank or prioritize landmarks within the context of the location-based game. In addition, the game server 110 can credit the player's account with a virtual currency, virtual energy, enhanced power, or other suitable reward for playing the mini-game.

At (522) the game server provides access or serves to the updated game data to the plurality of clients 120 over the network. A client 120 can then access the updated game data (524) and present the current version of the location-based game to the player based on the updated game data.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of modifying game data for a location-based game, the method comprising:

initiating, by a computer system, a mini-game associated with a location-based game by transmitting to a client device of a player of the location-based game landmark data associated with a landmark in a real world, wherein a geography of a virtual world parallels a geography of at least a portion of the real world, the landmark having a location in the real world that corresponds to a location in the virtual world;

receiving, by the computer system from the client device in response to the transmitted landmark data, mini-game data indicating a vote by the player in favor of the landmark;

determining, by the computer system, a ranking for the landmark based on the mini-game data and additional mini-game data received from client devices of additional players;

determining, by the computer system and based on the ranking, to include a virtual element at the location in the virtual world of the location-based game that corresponds to the location of the landmark in the real world;

updating, by the computer system, game data of the location-based game to include the virtual element at the location; and transmitting, by the computer system, the updated game data to a plurality of players.

2. The method of claim 1, wherein the additional mini-game data includes additional votes, the additional votes including a subset of votes in favor of the landmark and a subset of votes disfavoring the landmark.

3. The method of claim 2, wherein initiating the mini-game further comprises transmitting data associated with a second landmark in the real world, and wherein the subset of votes disfavoring the landmark are votes in favor of the second landmark.

4. The method of claim 1, wherein the ranking for the landmark is determined based on a number of votes in favor of the landmark included in the mini-game data and the additional mini-game data.

5. The method of claim 1, wherein determining to include the virtual element comprises:

determining to include the virtual element at the location in the virtual world in response to the ranking being greater than a threshold.

6. The method of claim 1, wherein determining to include the virtual element comprises:

determining to include the virtual element at the location in the virtual world in response to the ranking being higher than a second ranking determined for a second landmark.

7. The method of claim 1, wherein the landmark data comprises an image of the landmark.

8. The method of claim 1, wherein the landmark data comprises a request that the player provide an opinion in view of certain objective or subjective criteria.

9. A non-transitory computer-readable medium storing computer-executable instructions which when executed by one or more computer processors cause the one or more computer processors to perform operations comprising:

initiating, by a computer system, a mini-game associated with a location-based game by transmitting to a client device of a player of the location-based game landmark data associated with a landmark in a real world, wherein a geography of a virtual world parallels a geography of at least a portion of the real world, the landmark having a location in the real world that corresponds to a location in the virtual world;

receiving, by the computer system from the client device in response to the transmitted landmark data, mini-game data indicating a vote by the player in favor of the landmark;

determining, by the computer system, a ranking for the landmark based on the mini-game data and additional mini-game data received from client devices of additional players;

determining, by the computer system and based on the ranking, to include a virtual element at the location in the virtual world of the location-based game that corresponds to the location of the landmark in the real world;

updating, by the computer system, game data of the location-based game to include the virtual element at the location; and transmitting, by the computer system, the updated game data to a plurality of players.

10. The computer-readable medium of claim 9, wherein the additional mini-game data includes additional votes, the additional votes including a subset of votes in favor of the landmark and a subset of votes disfavoring the landmark.

11. The computer-readable medium of claim 10, wherein initiating the mini-game further comprises transmitting data associated with a second landmark in the real world, and wherein the subset of votes disfavoring the landmark are votes in favor of the second landmark.

12. The computer-readable medium of claim 9, wherein the ranking for the landmark is determined based on a number of votes in favor of the landmark included in the mini-game data and the additional mini-game data.

13. The computer-readable medium of claim 9, wherein determining to include the virtual element comprises:
 determining to include the virtual element at the location in the virtual world in response to the ranking being greater than a threshold.

14. The computer-readable medium of claim 9, wherein determining to include the virtual element comprises:
 determining to include the virtual element at the location in the virtual world in response to the ranking being higher than a second ranking determined for a second landmark.

15. The computer-readable medium of claim 9, wherein the landmark data comprises an image of the landmark.

16. The computer-readable medium of claim 9, wherein the landmark data comprises a request that the player provide an opinion in view of certain objective or subjective criteria.

17. A system comprising:
 one or more computer processors; and
  a non-transitory computer-readable medium storing computer-executable instructions which when executed by the one or more computer processors cause the one or more computer processors to perform operations comprising:
   initiating, by a computer system, a mini-game associated with a location-based game by transmitting to a client device of a player of the location-based game landmark data associated with a landmark in a real world, wherein a geography of a virtual world parallels a geography of at least a portion of the real world, the landmark having a location in the real world that corresponds to a location in the virtual world;
   receiving, by the computer system from the client device in response to the transmitted landmark data, mini-game data indicating a vote by the player in favor of the landmark;
   determining, by the computer system, a ranking for the landmark based on the mini-game data and additional mini-game data received from client devices of additional players;
   determining, by the computer system and based on the ranking, to include a virtual element at the location in the virtual world of the location-based game that corresponds to the location of the landmark in the real world;
   updating, by the computer system, game data of the location-based game to include the virtual element at the location; and
   transmitting, by the computer system, the updated game data to a plurality of players.

18. The system of claim 17, wherein the additional mini-game data includes additional votes, the additional votes including a subset of votes in favor of the landmark and a subset of votes disfavoring the landmark.

19. The system of claim 18, wherein initiating the mini-game further comprises transmitting data associated with a second landmark in the real world, and wherein the subset of votes disfavoring the landmark are votes in favor of the second landmark.

20. The system of claim 17, wherein the ranking for the landmark is determined based on a number of votes in favor of the landmark included in the mini-game data and the additional mini-game data.

* * * * *